Patented Apr. 25, 1939

2,155,417

UNITED STATES PATENT OFFICE 2,155,417

MANUFACTURE OF PROTEIN COMPOSITION

Carroll L. Griffith, Chicago, Ill., assignor to The Griffith Laboratories, Inc., Chicago, Ill., a corporation of Illinois No Drawing. Application September 11, 1937, Serial No. 163,353

9 Claims. (Cl. 99—18)

The present invention relates to a protein product particularly valuable as a food ingredient. It is a composition of the protein complex of blood and the protein complex of milk. These complexes are commonly termed hemoglobin in blood, and casein in milk. Both are used as foods and as food ingredients.

One object of the present invention is to provide an improved moisture-absorbent binder and moisture-imbibition agent, for causing sausage and other meat products containing it to retain a high moisture content in smoking, cooking or storing, thus to provide a substitute for cereal products so used.

Another object of the invention is to prepare a single product combining values from milk solids and values from blood solids.

A further object of the invention is to process blood to dry form in a manner such that the hemoglobin may be protected from the relatively high heat as in roll drying, which is the most economical method, by reason of the presence of the milk solids.

A further object of the invention is to provide the nutrients from blood in a palatable form for food or medicine.

Various other and ancillary objects and advantages will be apparent from the following description.

In the manufacture of meat products it has been a custom to add cereals such as corn flour, potato starch, tapioca flour, and more recently soy bean flour, to increase the water holding power of the product, thus to avoid shrinkage. Where starchy products are used, the swelling of the starch cells provides the desired property. But use of starch dilutes the protein content of the meat product, and its addition is therefore undesirable. The presence of starch is readily disclosed by an iodine test.

To overcome these disadvantages the trade has more recently used soy bean flour. This is a high protein product, and when raw, it has a high water-holding capacity. However, when added to meat and after smoking, heating or cooking this property deteriorates, and the soy bean treated meat products show considerable shrinkage.

By means of the present invention a product is produced which is high in protein, which is protein of animal origin, and which is particularly high and stable in water absorbing and holding capacity when added to meat, even after heating, smoking or cooking. The new product when added to meat combines the advantages of both cereals and the soy bean flour, without the disadvantages of either one.

Blood is often prescribed in anemia. In its usual form it has a bad taste and odor, and a bad psychological effect on the patient which may well offset the good which its consumption should produce. In the product of my invention as made according to my preferred example, the product appears much like malted milk. Cocoa, chocolate or vanilla or other desirable flavors may be added if desired. Such a product may be consumed a tablespoon full, more or less, in a glass of warm water as a palatable food of exceptional medicinal value.

When blood is dried directly on a roll, or by spraying, or when treated blood as a body of liquid is heated, the serum albumin content thereof coagulates and the coagulant seals and encloses the hemoglobin. This coagulation is not the coagulation of clotting, which is prevented by the use of agents such as sodium citrate and sodium chloride, and due to the fibrinogen content of the blood. When milk solids are present in the blood the hemoglobin becomes associated with the casein before the albumin coagulation, and an entirely different product results.

In the classification of proteins blood is considered as a conjugated protein in the chromoprotein series. As a conjugated protein it is a simple protein termed globin, combined with a material from the prosthetic group, namely a chromoprotein termed hematin, the latter being the color producing part of hemoglobin. The casein of milk is termed a phosphoprotein, making the protein complex. This again is a simple protein combined with phosphoric acid as the prosthetic group.

The invention may be carried out in numerous ways, but the preferred manner is as follows:

Fresh blood is collected from edible animals under sanitary conditions, and immediately treated to prevent coagulation. This may be done for a food product by adding from 1.25% to 2% by weight of sodium chloride. Although sodium chloride is present in blood, there is not enough to prevent coagulation, nor to preserve it. The added quantity preserves it as a liquid, and retards bacterial spoilage for several days so that it may be used for the present invention. Beef blood is preferred. It contains from 18% to 21% of solids. Its pH is about 7.5 to 7.65. Since the invention is concerned with the hemoglobin of the blood, and not essentially with the fibrinogen which is a normal constituent of blood, it is to be understood that hemoglobin may be prepared from raw blood apart from the fibrinogen. Any well known method may be used to remove the fibrinogen. However, the fresh blood with all its blood solids is preferred. Where it is not desired to have additional sodium chloride in the product, other known methods of preventing coagulation may be employed when the fibrinogen content is retained. For example, from ¼% to ¾% sodium citrate based on blood may be added. This is an ingredient edible in nature and therefore permissible for food purposes.

Fresh skim milk is preferred as the source of the animal casein. It contains about 9% to 10% of total solids of which 3% to 4% is casein, there being in addition 4½% to 5½% of lactose, 0.2% to 0.3% lactic acid, and some mineral salts.

The milk and blood are mixed, heated and dried. It is believed that the mixed proteins become most active to associate quickly at 150° F. and higher, but it is conceivable that at lower temperatures some sort of union or association may slowly take place. However, any common and practicable method of drying liquids to solids by evaporation of water provides suitable conditions for effecting the result without special attention to temperature control for that purpose. It has been observed that when the mixed blood and milk are cold the color is pink. As it is heated the pink color remains until at about 150° F. a change in color begins, the color becoming a chocolate brown at about 175° F.

The heating and drying as practically accomplished may follow the known practices for drying liquids to solids. This may involve drying on heated rolls, or spray drying, with preheating of the liquid. The preheating may involve concentration, as in vacuum pans to increase total solids. In using roll dryers, the liquid may be preheated before meeting the rolls, or may be preheated in the trough formed by two associated rolls. Preheating in coils may be practiced. The association may take place entirely or partially in the preheating, and may be completed in drying. The isolated dry product may differ from the unisolated product formed in water.

The invention may be carried out as follows: 18,000 lbs. of skim milk are combined with 325 lbs. of edible beef blood, which may have been previously treated. This is passed through about 60 feet of heated tubing of 2 inch to 3 inch diameter to attain a temperature of 140° F. to 150° F. This is then spread on heated rolls, where it dries in a few seconds. These may be at a quick-drying temperature such as 290° F. to 293° F. A residual powder is removed from the rolls. In this example the finished product contains about 3.75% blood solids. It contains 5% to 6% moisture, about 48% lactose, 6% to 8% inorganic salts, and 38% to 40% protein, containing principally the hemoglobin and the casein.

The finished product of the above example is a light reddish-brown powder. It is practically odorless, lacking the animal odor of dried blood, and lacking the "lactic" or sour odor of dried milk. It is stable and non-hygroscopic. The sodium chloride content acts as a preservative for solid material. In a 10% suspension in water it has a pH of about 6.6. The product has the property of being changed in color by the presence of nitrous acid, as derived from nitrite or nitrate. Consequently, when the composition is used in a meat product containing one of these materials for the normal purpose of curing the meat, the new product changes color to a bright red, which improves the appearance of the meat product. The product is like meat in these respects: that it presents combining power for nitrous acid to produce a change in coloration, and that it has an animal origin and a high protein content.

It is believed that under the conditions of heating or heating and drying, the sodium chloride may react with the casein, or part of the combined casein, or some other amphoteric ingredient. This is evidenced by a change in the pH to 6.6 or 6.8, or a slightly acid condition. The phosphoric acid in the casein probably enters into the reaction forming some sodium phosphate salt as a buffer agent on the acid side. This probably remains as evidenced by the pH of the product dissolved in water.

Since there are a variety of components other than protein in both blood and milk, it is to be understood that there may be other reactions occurring, with products present which influence the ratio in which the proteins may combine.

The new composition has been found very useful in meat products. In particular it gives good color, and helps the product to hold moisture against drying conditions. In addition, it has high food value with available forms of mineral constituents. This use of the product has a direct relation to the quantities given in the above example. Certain present regulations limit the use of dried blood in meat products to 3 ounces of blood solids to 100 lbs. of meat. Where the new product contains 3¾% of blood solids in combined form it may be used in the proportion up to 80 ounces to 100 lbs. of meat, and the use be within the regulation.

It is therefore seen that the ratio disclosed is not critical. For commercial uses in the meat field, compositions are useful which contain an equivalency of from 2% to 5% blood solids or the hemoglobin thereof. Where 50% of blood solids is present, and blood and skim milk are used, the original mixture will require about 2 parts of milk to 1 part of blood. Where 2% of blood solids is present, and blood and milk are used, the original mixture will require about 1 part of blood to 100 parts of milk. However, the invention is not to be considered as limited.

I claim:

1. The method of making a protein product which comprises mixing animal blood hemoglobin in liquid form with animal skim milk in liquid form, heating the mixture at a temperature of from 140° F. to 175° F., while simultaneously concentrating the total solid content thereof to yield a liquid concentrate, and quickly drying the liquid concentrate containing the reaction product to remove water and form a dry solid.

2. The method of making a nutritional protein product which comprises mixing to a homogeneous liquid mass liquid containing as the predominant protein hemoglobin of animal blood and liquid containing as the predominant protein casein of animal milk, and removing water from the homogeneous liquid to provide a solid combining the hemoglobin and casein each in intimate association with the other.

3. A dry solid product comprising essentially the dried residue of a homogeneous liquid containing hemoglobin of animal blood and casein of animal milk, in which dry product the hemoglobin and casein comprise the predominant protein material and are intimately associated with each other.

4. A dry solid product comprising essentially the dried residue of a liquid mixture of whole animal blood and of animal milk, in which product hemoglobin and casein comprise the predominant protein material and are intimately associated with each other and with the non-protein solids of said whole blood and said milk.

5. A dry solid product comprising essentially the dried residue of a liquid mixture of whole animal blood and of animal milk, in which product hemoglobin content from 1 to 50 parts of whole animal blood and casein content from 100 parts of animal milk comprise the predominant protein material and are intimately associated with each other.

6. A colored edible protein product comprising essentially hemoglobin of animal blood and casein of animal milk, said products being proteins in intimate association in a non-liquid dewatered concentrate of a homogeneous liquid containing said proteins in which the hemoglobin content is derived from 1 to 50 parts of animal blood and the casein is derived from 100 parts of animal milk.

7. The method of making a nutritional protein product which comprises mixing 1 to 50 parts of liquid animal blood with 100 parts of liquid animal milk, treating the mixed liquids to render the content thereof homogeneously mixed in the liquid condition, and removing water to provide a dry solid while keeping the solid content in substantially homogeneous form, whereby the resulting product is uniform in character containing hemoglobin of the blood intimately associated with casein of the milk.

8. The method of making a nutritional protein product which comprises dewatering to a non-liquid form a homogeneous liquid containing animal casein, animal hemoglobin, and sodium chloride, to provide a homogeneous concentrate in which the principal protein content is hemoglobin and casein in intimate association, and in which sodium chloride is a preservative.

9. A solid dry product comprising essentially the dried residue of an aqueous mixture, said residue comprising essentially hemoglobin of animal blood and protein of animal milk, in which product the hemoglobin and protein of the milk are the predominant protein material and are intimately associated with each other and with the non-protein contents of said aqueous mixture.

CARROLL L. GRIFFITH.